(No Model.)

L. PARKER.
LIFE SAVING APPARATUS FOR SHIPS.

No. 545,092. Patented Aug. 27, 1895.

WITNESSES:
George W. Jaekel
Cora C. Gast

INVENTOR
Lew Parker
BY
Graver Raegener
ATTORNEYS.

UNITED STATES PATENT OFFICE.

LEW PARKER, OF BROOKLYN, ASSIGNOR OF ONE-FOURTH TO WILLIAM J. QUINLAN, OF PORT RICHMOND, NEW YORK.

LIFE-SAVING APPARATUS FOR SHIPS.

SPECIFICATION forming part of Letters Patent No. 545,092, dated August 27, 1895.

Application filed November 6, 1894. Serial No. 528,025. (No model.)

*To all whom it may concern:*

Be it known that I, LEW PARKER, a citizen of the United States, residing in the city of Brooklyn, county of Kings, and State of New York, have invented certain new and useful Improvements in Life-Saving Apparatus for Ships, of which the following is a specification.

This invention has reference to an improved life-saving apparatus which is to be used on board of steamers, sailing-vesels, and other ships, and by which a vessel that has foundered near the shore is enabled to establish communication with the shore in a quick, effective, and reliable manner; and the invention consists of a life-saving apparatus for ships which comprises a balloon provided with guide-rollers, a safety-line passing over said guide-rollers, a drum on which the safety-line is wound, mechanism by which the free end of the line is retained while the balloon unwinds the line from the drum, and means for releasing the free end of the line at the proper moment while simultaneously arresting the motion of the winding-drum, so that the free end of the line can be liberated by the balloon dropped on the shore and communication established by the same with the vessel in danger.

Figure 1:
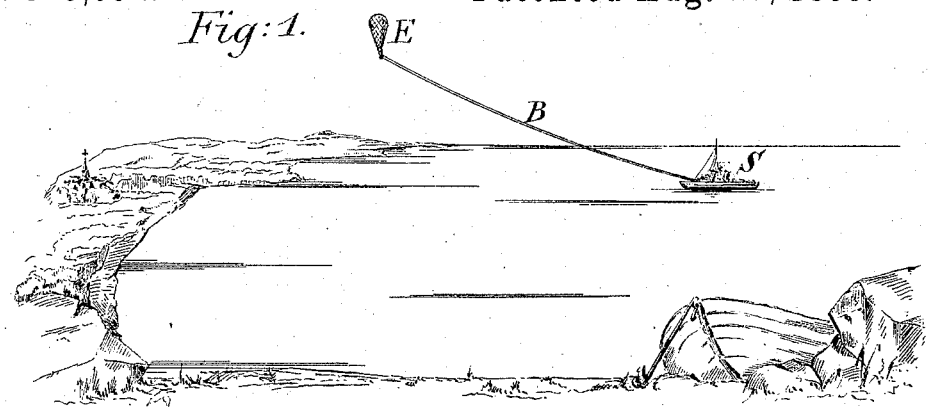
Figure 2:
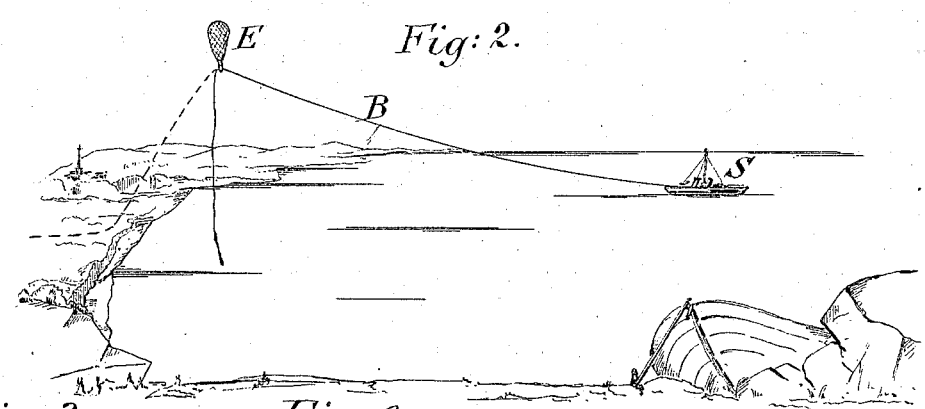
Figure 3:
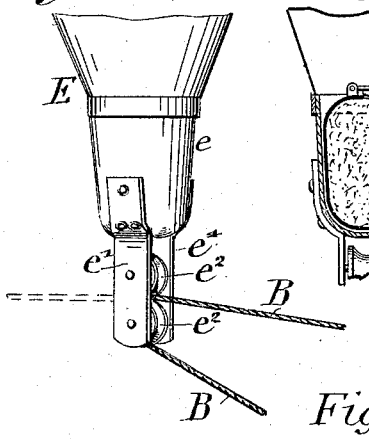
Figures 4, 6:
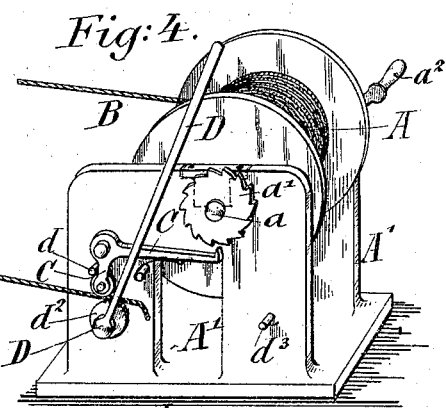
Figure 5:
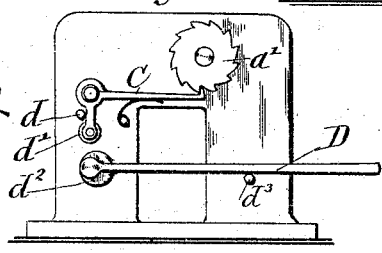

In the accompanying drawings, Figure 1 represents a perspective view of a vessel, showing my improved life-saving device in the act of being carried from the vessel toward the shore. Fig. 2 is also a perspective view, showing the life-saving line after it is released by the retaining mechanism on the vessel and as the same is being gradually detached from the balloon that carries the line toward the shore. Fig. 3 is a perspective view of the lower part of the balloon, showing the guide-pulleys for the life-saving line. Figs. 4 and 5 are side elevations of the line retaining and unwinding mechanisms, showing the same respectively in position before and after the free end of the line is released; and Fig. 6 is a longitudinal section of the socket at the lower part of the balloon and of the valved cartridge contained therein.

Similar letters of reference indicate corresponding parts.

Referring to the drawings, S represents a steamer, sailing-vessel, or ship of any kind, on which my improved life-saving apparatus is arranged. This apparatus consists of a drum A, on which is wound up a life-saving line B of a length sufficient to make connection within certain limits from a vessel toward the shore. The shaft $a$ of the drum A is supported in bearings of upright standards A', which are attached to a suitable base-block $A^2$ that is made portable or permanently attached at any suitable point to the deck of the vessel. To one end of the shaft $a$ of the drum A is applied a ratchet-wheel $a'$, which is engaged by the outer hook-shaped end of a spring-actuated bell-crank lever C that is fulcrumed to the side of one of the standards A', the spring acting on the longer arm of the bell-crank lever C and imparting thereto a tendency to move the outer pawl-shaped end of the arm into engagement with the teeth of the ratchet-wheel. A stop-pin $d$ serves to arrest the shorter arm of the lever C, so as to prevent the same from being moved too far in the opposite direction. To the end of the shorter arm of the lever C is applied a roller $d'$, while below said roller a toothed cam $d^2$ is eccentrically pivoted to the standard A', said cam being attached to a lever D. One end of the life-saving line B is attached to the drum A, and the line being wound up on the drum A the parts are in position for use, the lever D resting, when not in use, on a stop-pin $d^3$ of the standard, as shown in Fig. 5.

In connection with the life-saving line, and as a means of lifting and carrying it toward the shore, is used a balloon E, which is made of a size sufficient to support the weight of the line and carry it upward and toward the shore. The lower end of the balloon is supplied with a sheet-metal socket $e$, to which is attached a sheave $e'$, in which two guide-pulleys $e^2$ are arranged, one below the other, between which the line B is passed, the free end of the line being conducted below the lever $e^2$ and between the roller $d'$ of the elbow-lever C and the toothed cam $d^2$, so as to be locked by the cam and roller on lifting the lever D, as shown in Fig. 4. In this position of the parts the longer arm or pawl of the bell-crank lever C is withdrawn from the teeth of the ratchet-wheel, so that the drum can freely rotate and follow the unwinding of the life-saving line B. The balloon E is inflated at the proper moment by placing a suitably-valved cartridge F, containing a compressed gas, preferably hydrogen gas, in the lower part or socket $e$ of the balloon and opening the valve $f$ of the cartridge by turning the handle $f'$ so that the gas can escape, inflate the balloon, and enable the same to rise with the life-saving line toward the shore.

My improved apparatus is operated as follows: Whenever a ship is in danger of foundering near the shore, the wind generally blows from the sea toward the shore, and it is this fact which is taken advantage of in my life-saving apparatus, as it cannot be used except in such emergencies. As soon as it is necessary to make connection with the shore, so as to save the lives of the persons on board of the foundered vessel, one of a number of balloons that are kept on board for use in connection with the life-saving apparatus is connected with the life-saving line by passing the free end of the line between the guide-pulleys at the lower part of the balloon and placing it between the roller and eccentric cam before described. The lever is then raised, so that the free end of the line is firmly clamped in position, and the locking-pawl of the bell-crank lever withdrawn from the ratchet-wheel on the drum A. The cartridge or receptacle which contains the compressed gas is then placed into the lower part of the balloon, opened so as to produce the discharge of the gas and the inflation of the balloon, which is then permitted to rise. By the lifting action of the balloon the life-saving line is quickly unwound from the drum and carried up and toward the shore by the balloon, as shown in Fig. 1, the line passing from the drum over the guide-rollers of the balloon and back again to the clamping device arranged alongside of the drum. As soon as the balloon is supposed to be close enough to the shore so that the length of line paid out will permit a connection with the shore, the lever is quickly moved in downward direction, so that the cam releases the life-saving line, while the spring-actuated locking-arm of the bell-crank lever C is simultaneously moved by its spring into engagement with the teeth of the ratchet-weeel, whereby the unwinding motion of the drum is arrested and the free end of the line B quickly moved away from the vessel and passed through between the guide-pulleys on the balloon until it clears the guide-pulleys entirely, and then, being released from the balloon, drops down on the shore, as shown in dotted lines in Fig. 2, while the liberated balloon is carried inland by the wind. When the line is dropped on the shore, the connection between the vessel and the shore can be established in the usual manner, either by guiding a life-saving vessel or any other life-saving device along the same.

In case the connection of the vessel with the shore should not be successfully established on the first attempt, but should miscarry, either because the line was released too soon or for any other reason, then the life-saving line B is quickly wound up again on the drum, which is for this purpose provided with a crank $a^2$ at the opposite end of its shaft. Another balloon is then placed on the line and the free end of the same clamped again by the clamping device, the balloon being then inflated and permitted to rise with the line, care being taken that the free end of the line is released from the clamping mechanism at the proper time, so that the balloon carries the line toward the shore and finally drops the same.

It is obvious that the construction of my improved life-saving apparatus may be variously modified. For instance, the cartridge or receptacle containing hydrogen gas under pressure may be arranged directly in the socket at the lower part of the balloon and provided with a suitable stop-cock, which when it is opened discharges the contents of the cartridge into the balloon and inflates the same, or any other arrangement may be devised by which the cartridge may be connected with the balloon. Likewise, any suitable mechanism for clamping or releasing and arresting the motion of the drum may be employed, as these mechanical features can be varied to a considerable extent without departing from the spirit of my invention.

Having thus described my invention, I claim as new and desire to secure by Letters Patent—

1. A life-saving apparatus for ships, consisting of a life-saving line, a drum on which said line is wound, a balloon provided with a guide-roller at its lower part over which the line passes, whereby the balloon is connected with the line, means for inflating the balloon at the proper moment, mechanism for clamping the free end of the life-saving line, and mechanism for releasing the line and simultaneously arresting the unwinding motion of the drum, substantially as set forth.

2. In a life-saving apparatus for vessels, the combination with a life-saving line, and means for connecting the same at one end to a vessel, of a balloon provided with a guide-device through which the line loosely passes, and means for clamping the free end of the line and for releasing the same when the balloon is near the shore, substantially as set forth.

3. In a life-saving apparatus for vessels, the combination with a frame that is adapted to be supported on a vessel, a drum mounted to revolve in the frame and a life-saving line wound upon said drum, of a balloon connected with the line and provided with a guide-device through which the line loosely passes, mechanism for clamping or releasing the free end of the life-saving line and mechanism for arresting the drum when the free end of the life-saving line is released, substantially as set forth.

4. In a life-saving apparatus for ships, a balloon provided with a socket at its lower part, a sheave supported from said socket, guide-pulleys supported in the sheave, a life-saving line guided between said pulleys and around one of the same, means for connecting one end of the line with the vessel, means for inflating the balloon when it is desired to convey the life-saving line toward the shore, and means for clamping and releasing the other end of the line, substantially as set forth.

5. The combination with a balloon, provided with means for inflating the same and with a guide-device applied to the lower end of the balloon, a life-saving line passing over said guide-device, a winding-drum to which one end of the life-saving line is attached, means for clamping the free end of the life-saving line, means for releasing said clamping-device and means for simultaneously arresting the drum, substantially as set forth.

6. The combination of a life-saving line, a drum on which the same is wound, a supporting-frame for the shaft of said drum, a ratchet-wheel on the end of the shaft, a crank at the opposite end of the same, a spring-actuated bell-crank lever fulcrumed to the supporting-frame of the drum, said lever being provided with a pawl on the longer and a roller on the shorter arm, a toothed cam pivoted eccentrically to the supporting-frame below said roller, and a lever attached to the eccentric cam so as to clamp the free end of the line between the roller and cam, or release the same for permitting the engagement of the pawl of the bell-crank-lever with the ratchet-wheel on the shaft of the winding-drum, substantially as set forth.

In testimony that I claim the foregoing as my invention I have signed my name in presence of two subscribing witnesses.

LEW PARKER.

Witnesses:
PAUL GOEPEL,
GEO. L. WHEELOCK.